C. H. TAYLOR & H. E. COFFIN.
CLUTCH.
APPLICATION FILED AUG. 22, 1910.
1,034,845.
Patented Aug. 6, 1912.
2 SHEETS—SHEET 2.
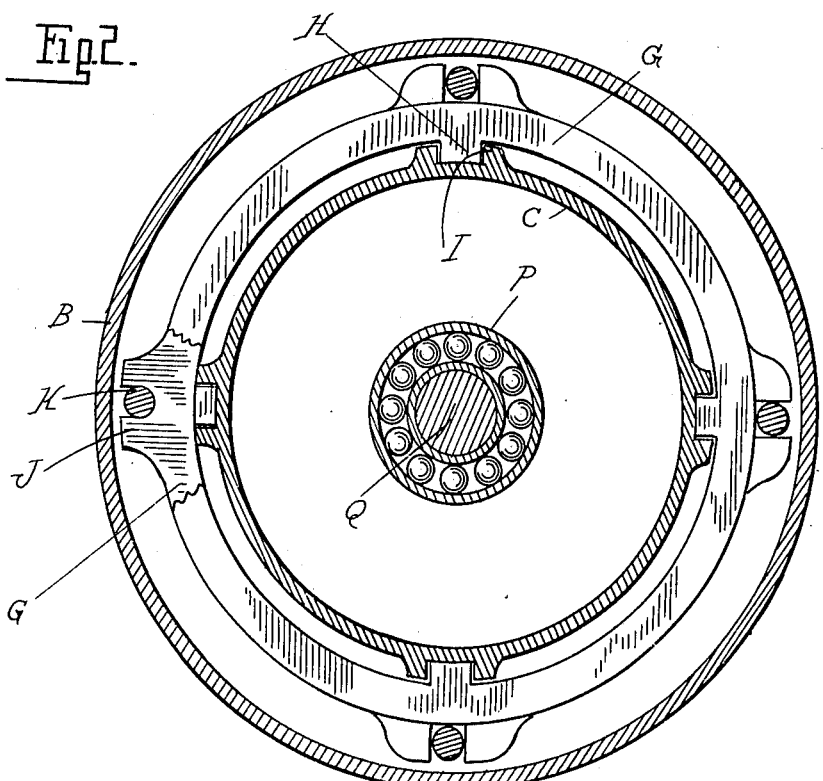
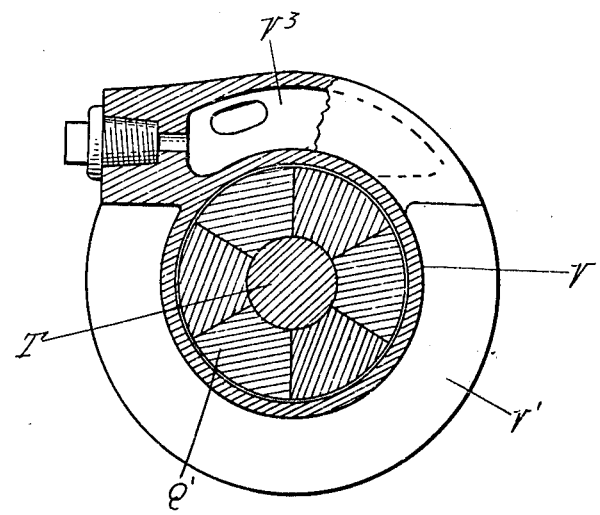
Witnesses
Inventor
Howard E. Coffin
Cecil Hamelin Taylor
By Att'ys

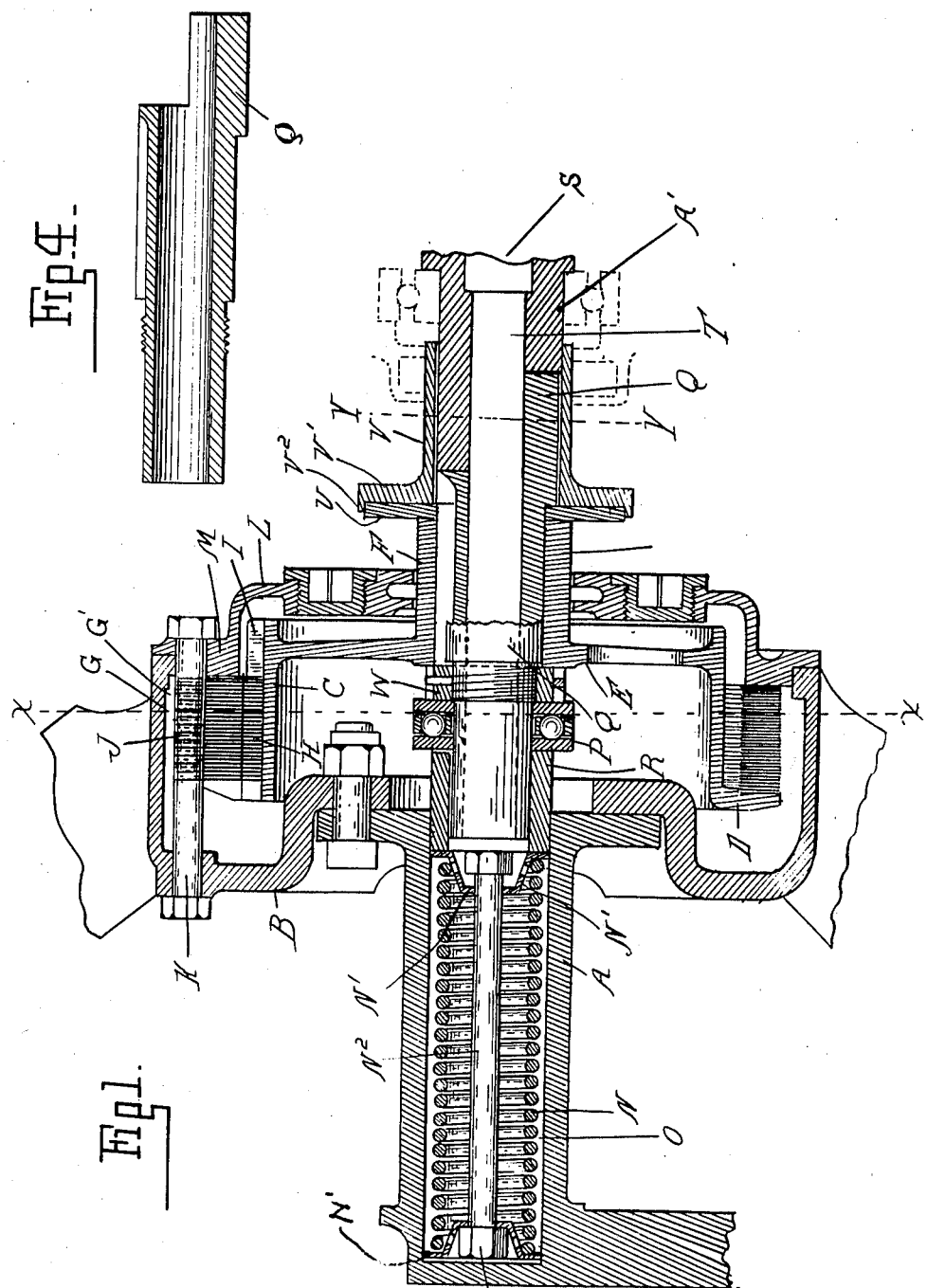

UNITED STATES PATENT OFFICE.

CECIL HAMELIN TAYLOR AND HOWARD E. COFFIN, OF DETROIT, MICHIGAN, ASSIGNORS TO HUDSON MOTOR CAR COMPANY, OF DETROIT, MICHIGAN, A CORPORATION OF MICHIGAN.

CLUTCH.

1,034,845.  Specification of Letters Patent.  Patented Aug. 6, 1912.

Application filed August 22, 1910. Serial No. 578,428.

*To all whom it may concern:*

Be it known that we, CECIL HAMELIN TAYLOR and HOWARD E. COFFIN, citizens of the United States of America, residing at Detroit, in the county of Wayne and State of Michigan, have invented certain new and useful Improvements in Clutches, of which the following is a specification, reference being had therein to the accompanying drawings.

The invention relates to clutches more particularly designed for use on automobiles of that type in which the coupling is effected by the cumulative friction of a plurality of disks.

The invention consists in various features of construction as hereinafter set forth.

In the drawings,—Figure 1 is a central longitudinal section through the clutch; Fig. 2 is a section upon line $x$—$x$ Fig. 1. Fig. 3 is a section on line $y$—$y$. Fig. 4 is a longitudinal section of the shaft Q.

It is one of the objects of the invention to condense the structure so as to limit the longitudinal dimension thereof, which is particularly advantageous in automobile construction. This we have accomplished by a novel arrangement of the spring and coöperating parts for pressing the clutch disks into frictional contact.

A further feature is the arrangement of the clutch assembly in the fly-wheel of the engine so that it may be removed or replaced as a unit, and when in position will be inclosed in an oil tight, dust proof case.

As shown, A is a crank shaft of the engine and B is the fly-wheel mounted at the end thereof. This fly-wheel is formed with a hollow center of sufficient size to receive the clutch assembly as hereinafter described.

C is a drum or head on which the clutch disks are mounted, D is an annular flange at the inner end of the drum which constitutes one of the disk clamping heads, E is a spider uniting the drum with a hub F arranged in alinement with the crank shaft, G and G' are the coöperating disks arranged alternately in series upon the drum C. The disks G are provided with inwardly extending lugs H which engage longitudinal grooves I in the periphery of the drum, and the disks G' are provided with outwardly extending slotted lugs J which are anchored upon bolts or pins K engaging the fly-wheel. These bolts K also form a means of attaching to the fly-wheel the cover plate L which completes the housing for the clutch, and the annular portion M on the inner face of this cover constitutes the head or abutment against which the disks G and G' are clamped.

For frictionally engaging the disks a spring is provided for yieldably pressing the flange D of the drum C against the head M. This spring cannot be placed within the clutch housing without necessarily increasing the dimensions thereof, and to avoid this we have devised the novel arrangement of the spring within the recess in the crank shaft. Thus as shown, N is the spring engaging the central recess O in the crank shaft, its inner end abutting against the end of the recess and the outer end bearing against a member for transmitting the tension to the drum C. This transmission member preferably comprises a ball thrust bearing P which is mounted on the shaft Q to which the hub F is secured, R is a sleeve upon the shaft Q arranged intermediate the bearing P and the end of the spring, while between the bearing P and the hub F is arranged a collar W having a threaded engagement with the shaft Q. Thus the tension of the spring is transmitted to the hub F and flange D, while the ball bearing P permits the relative rotary movement of the crank shaft A and the drum C.

The amount of movement necessary for frictionally engaging and disengaging the clutch disks is very slight but to secure the proper tension the spring N must be under initial compression and this requires a greater amount of movement as well as interference with the ease with which the parts of the clutch may be assembled. We have therefore provided means for tensioning the spring and limiting the movement thereof comprising the recessed collars or heads N' at opposite ends of the spring, and a central bolt $N^2$ having nuts $N^3$ engaging the recessed heads. By this means a proper tension may be placed upon the spring and suitably proportioning the combined lengths of the spring, sleeve R, ball bearing P, etc., the parts may be assembled without resistance from the spring, to a point where the cover L is initially engaged with the clamping bolts K. By then tightening these bolts the cover may be drawn to its seat and at the same time the sleeve R will be pressed against the head N' of the spring so as to free it from the head N³ of the bolt and place the spring tension upon the drum and disks.

S is the driven shaft in axial alinement with the crank shaft A. This alinement is maintained preferably by providing a telescopic or a longitudinally slidable engagement between the shaft S and the shaft Q, which as shown, is obtained by the radially inter-engaging jaws Q'. These shafts are also preferably hollow and are further alined by a central shaft T engaging therewith. The collar R telescopically engages the recess in the crank shaft A. Therefore, all of the parts from the crank shaft to the driven shaft S are held in alinement.

For actuating the clutch to release the spring tension a thrust collar U is arranged to engage the end of the hub F.

V is a sleeve surrounding the inter-engaging portions of the shafts S and Q and having a flange V' abutting against the collar U and a peripheral flange V² surrounding said collar. The flange V' is recessed at V³ to form an oil chamber which is in communication with the bearing of the flange upon the collar U and also with the interior of the sleeve. This will result in producing the pumping of the oil by the relative endwise movement of the jaws Q' on the shafts Q and S which will maintain the lubrication of the collar U.

The construction described is one that reduces the longitudinal dimension of the clutch to the minimum, as the spring is within the crank shaft, the clutch disks within the fly-wheel and the only projecting parts are the shaft Q and sleeve V. Furthermore, the necessity of an outer journal bearing for the shaft Q on the cover L is avoided by the inter-engagement of the shafts Q and S by the radial jaws Q' and shaft T holding them in perfect alinement with each other and the crank shaft.

What we claim as our invention is:

1. The combination of a drive shaft and a driven shaft in axial alinement, an intermediate shaft having a rotatably fixed and longitudinally slidable engagement with one of said shafts and a telescopic engagement with a recess in the other of said shafts, a spring within said recess yieldably pressing against said telescoping shaft, a housing mounted on said recessed shaft, and coöperating friction members within said housing secured respectively to said housing and to said intermediate shaft and held in engagement by the tension of said spring.

2. The combination of a drive shaft and a driven shaft in axial alinement, an intermediate shaft telescopically engaging said drive and driven shafts and rotatably secured to one, a clutch assembly mounted upon said intermediate shaft, a housing for said assembly mounted on one of said first mentioned shafts, a spring for said clutch, and means for securing said clutch assembly within said housing and simultaneously placing the spring tension upon the clutch.

3. The combination with a drive shaft and a driven shaft in axial alinement, of an intermediate shaft telescopically engaging said drive and driven shafts and rotatably fixed to one, a clutch assembly mounted on said intermediate shaft, a housing for said assembly mounted on one of the other shafts, a spring located in a recess in the shaft upon which said housing is mounted, and means for securing said clutch assembly within said housing and simultaneously pressing said intermediate shaft against said spring to place the tension on the clutch members.

4. The combination with a drive shaft and a driven shaft in axial alinement, of an intermediate shaft telescopically engaging said drive and driven shaft and rotatably fixed to one, a clutch assembly including a cover for the housing mounted upon said intermediate shaft, a housing for said assembly mounted upon one of the other shafts, a spring having means for placing the same under tension located in a recess in the shaft upon which said housing is mounted, a thrust bearing between said spring and said clutch assembly, and means for securing the cover of said housing and the assembly to said housing and simultaneously pressing said thrust bearing against said spring.

5. The combination of a clutch assembly shaft, a clutch assembly mounted thereon, a housing for said clutch assembly, a crank shaft on which said housing is mounted having a recess therein of a length to extend beyond the housing, and a spring positioned within said recess for operating upon said clutch.

6. The combination with a shaft, a clutch assembly mounted thereon, a communicating cover for the housing, a housing for said clutch assembly, a recessed shaft on which said housing is mounted, a spring provided with self contained tensioning means located in said recess, and means for securing the cover of said housing to the latter and simultaneously placing the spring tension upon the clutch.

7. The combination of drive and driven shafts in axial alinement, an intermediate shaft telescopically and removably engaging said shafts and rotatably fixed to one, a clutch assembly mounted upon said intermediate shaft, a housing for said assembly mounted on one of the other shafts, a spring having self contained tensioning means located in a recess in the shaft on which said housing is mounted, an anti-friction thrust bearing intermediate said spring and the clutch assembly, and means for securing said clutch assembly in said housing and simultaneously pressing said thrust bearing against said spring to receive the tension of the latter.

8. The combination of an engine crank shaft, having a recess in the end thereof, a fly-wheel mounted on said crank shaft and recessed to form a housing communicating with the recess in said shaft, a driven shaft in axial alinement with said crank shaft, an intermediate shaft removably engaging said crank shaft and driven shaft and rotatably fixed to one, a clutch assembly mounted on said intermediate shaft and inclosed in said housing, and a spring engaging the recess in said crank shaft for tensioning said clutch.

9. The combination of a housing, a removable cover therefor, a shaft upon which said cover is mounted, additional elements mounted on said shaft constituting with said cover a clutch assembly adapted to be inclosed in said housing, a recessed shaft on which said housing is mounted, a spring within the recess of said shaft having means for limiting the expansion and movement thereof, and means for securing said cover to said housing and simultaneously placing the tension of said spring upon said clutch assembly.

10. The combination of a shaft, a clutch drum mounted thereon, friction disks upon said drum having an abutment thereon for one end of the series, a relatively movable head mounted on said shaft forming an opposed abutment for the series, a housing for said drum closed by said relatively movable head, a recessed shaft on which said housing is mounted, a spring in the recess in said shaft, clamping means for securing said head to said housing and anchoring the alternate disks of the series, an anti-friction thrust bearing upon said first mentioned shaft adjacent to said drum, and a sleeve upon the same shaft for bearing against said thrust bearing and said spring to transmit the tension of the latter to the series of disks.

11. The combination of a shaft, a drum mounted thereon, a series of friction disks mounted on said drum, the alternate disks of the series being rotatably fixed thereto, a housing for said drum and disks, a removable cover for said housing mounted upon said shaft and constituting an abutment for one end of the series of disks, and clamping means for securing said cover to said housing forming an anchor for the alternate disks of the series.

12. A clutch, comprising a housing, coöperating friction members therein, a crank shaft on which said housing is mounted, a recess in said crank shaft extending beyond said housing, and a spring extending within said recess for tensioning said clutch.

13. The combination of a crank shaft having a recess within the bearing portion thereof, a driven shaft, a housing mounted on said crank shaft, coöperating friction members secured respectively to said crank and driven shafts, and located within said housing, and a spring extending within said recessed portion of the crank shaft for holding said friction members in engagement.

14. The combination of a crank shaft, a driven shaft a housing mounted on said crank shaft, coöperating friction members secured respectively to said driven shaft and housing and located within said housing, said crank shaft having a recess in the end thereof and extending through the bearing portion of said crank shaft adjacent to said housing, and a spring within said recess for pressing said friction members into engagement.

15. The combination with a crank shaft and a driven shaft in alinement with each other, one of said shafts being centrally recessed to telescopically engage the other shaft, coöperating friction members surrounding said shafts and respectively secured to the same, heads mounted on said shafts forming opposed abutments for said friction members, a recess in said crank shaft, and a spring in said recess yieldably pressing against the alined shaft for actuating one of the opposed abutments toward the other to hold said friction members in engagement.

In testimony whereof we affix our signatures in presence of two witnesses.

CECIL HAMELIN TAYLOR.
HOWARD E. COFFIN.

Witnesses:
LENA M. CARLE,
ETHEL J. ESSIG.